United States Patent
Doetsch et al.

(10) Patent No.: US 11,479,660 B2
(45) Date of Patent: *Oct. 25, 2022

(54) POLETHYLENE COMPOSITION HAVING HIGH SWELL RATIO

(71) Applicant: BASELL POLYOLEFINE GMBH, Wesseling (DE)

(72) Inventors: Diana Doetsch, Bad Kreuznach (DE); Bernd Lothar Marczinke, Frankfurt (DE); Gerhardus Meier, Frankfurt (DE); Ulf Schueller, Weiterstadt (DE); Rainer Sattel, Waldsee (DE); Peter Bisson, Ludwigshafen (DE)

(73) Assignee: Basell Polyolefine GmbH, Wesseling (DE)

( * ) Notice: Subject to any disclaimer, the term of this patent is extended or adjusted under 35 U.S.C. 154(b) by 123 days.

This patent is subject to a terminal disclaimer.

(21) Appl. No.: 16/461,862

(22) PCT Filed: Oct. 30, 2017

(86) PCT No.: PCT/EP2017/077799
§ 371 (c)(1),
(2) Date: May 17, 2019

(87) PCT Pub. No.: WO2018/091261
PCT Pub. Date: May 24, 2018

(65) Prior Publication Data
US 2019/0338108 A1  Nov. 7, 2019

(30) Foreign Application Priority Data

Nov. 17, 2016 (EP) .................................... 16199338

(51) Int. Cl.
*C08L 23/06* (2006.01)
*C08F 2/00* (2006.01)
*C08F 4/02* (2006.01)
*C08L 23/08* (2006.01)

(52) U.S. Cl.
CPC .............. *C08L 23/06* (2013.01); *C08F 2/001* (2013.01); *C08F 4/022* (2013.01); *C08L 23/0815* (2013.01); *C08J 2323/08* (2013.01); *C08L 2205/025* (2013.01); *C08L 2308/00* (2013.01)

(58) Field of Classification Search
CPC ...................................................... C08L 23/06
See application file for complete search history.

(56) References Cited

U.S. PATENT DOCUMENTS

| | | | | |
|---|---|---|---|---|
| 9,353,206 B2* | 5/2016 | Vittorias | ............. | C08L 23/0815 |
| 9,428,623 B2* | 8/2016 | Vittorias | ............. | C08L 23/0815 |
| 9,458,312 B2* | 10/2016 | Vittorias | ................. | C08L 23/06 |
| 9,512,308 B2* | 12/2016 | Vittorias | ............. | C08L 23/0815 |
| 9,580,583 B2* | 2/2017 | Vittorias | ............. | C08L 23/0815 |
| 9,738,777 B2* | 8/2017 | Vittorias | ............. | C08L 23/0815 |
| 2009/0283939 A1* | 11/2009 | Turner | .................... | C08L 23/04 264/500 |
| 2014/0243475 A1 | 8/2014 | Mavridis et al. | | |
| 2015/0267010 A1* | 9/2015 | Vittorias | ............. | C08L 23/0815 526/226 |
| 2018/0362743 A1 | 12/2018 | Vittorias et al. | | |

FOREIGN PATENT DOCUMENTS

| | | | |
|---|---|---|---|
| CN | 101443405 A | | 5/2009 |
| EP | 560312 | * | 9/1993 |
| EP | 2818508 A1 | | 12/2014 |
| EP | 2818509 A1 | | 12/2014 |
| JP | 2015532349 A | | 11/2015 |
| KR | 101667906 B1 | | 10/2016 |
| RU | 2688145 C1 | | 5/2019 |
| WO | 2016075165 A1 | | 5/2016 |
| WO | 2016078879 A1 | | 5/2016 |
| WO | 2016206959 A1 | | 12/2016 |

OTHER PUBLICATIONS

International Search Report and Written Opinion dated Dec. 21, 2017 (Dec. 21, 2017) for Corresponding PCT/EP2017/077799.

\* cited by examiner

*Primary Examiner* — Irina Krylova (57) ABSTRACT

A polyethylene composition for producing blow-molded hollow articles, having the following features:
1) density from 0.940 to 0.955 g/cm³ determined according to ISO 1183 at 23° C.;
2) ratio MIF/MIP from 12 to 30;
3) Mz from 2,000,000 to 4,500,000 g/mol;
4) $\eta_{0.02}$ from 160,000 to 300,000 Pa·s; and
5) long-chain branching index, LCBI, equal to or greater than 0.75.

10 Claims, 1 Drawing Sheet

POLYETHYLENE COMPOSITION HAVING HIGH SWELL RATIO

This application is the U.S. National Phase of PCT International Application PCT/EP2017/077799, filed Oct. 30, 2017, claiming benefit of priority to European Patent Application No. 16199338.1, filed Nov. 17, 2016, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a polyethylene composition useful for making formed articles.

BACKGROUND OF THE INVENTION

In some instances, polyethylene compositions are useful for making formed articles.

SUMMARY OF THE INVENTION

In a general embodiment, the present disclosure provides a polyethylene composition having the following features:
1) density from 0.940 to 0.955 g/cm$^3$, alternatively from 0.940 to 0.951 g/cm$^3$, alternatively from 0.945 to 0.952 g/cm$^3$, alternatively from 0.946 to 0.952 g/cm$^3$, alternatively from 0.945 to 0.951 g/cm$^3$, alternatively from 0.946 to 0.951 g/cm$^3$, determined according to ISO 1183 at 23° C.;
2) ratio MIF/MIP from 12 to 30, alternatively from 15 to 28, alternatively from 17 to 27, where MIF is the melt flow index at 190° C. with a load of 21.60 kg and MIP is the melt flow index at 190° C. with a load of 5 kg, both determined according to ISO 1133;
3) Mz from 2,000,000 to 4,500,000 g/mol, alternatively from 2,500,000 to 4,200,000 g/mol, alternatively from 2,500,000 to 3,500,000 g/mol, where Mz is the z-average molecular weight measured by GPC;
4) $\eta_{0.02}$ from 160,000 to 300,000 Pa·s, alternatively from 170,000 to 300,000 Pa·s, alternatively from 180,000 to 300,000 Pa·s, alternatively from 160,000 to 250,000 Pa·s., alternatively from 170,000 to 250,000 Pa·s, alternatively from 180,000 to 250,000 Pa·s, wherein $\eta_{0.02}$ is the complex shear viscosity at an angular frequency of 0.02 rad/s, measured with dynamic oscillatory shear in a plate-plate rotational rheometer at a temperature of 190° C.; and
5) long-chain branching index, LCBI, equal to or greater than 0.75, alternatively equal to or greater than 0.80, wherein LCBI is the ratio of the measured mean-square radius of gyration $R_g$, measured by GPC-MALLS, to the mean-square radius of gyration for a linear PE having the same molecular weight.

BRIEF DESCRIPTION OF THE DRAWINGS

These and other features and aspects of the present disclosure will become better understood with reference to the following description and appended claims, and accompanying drawing FIGURE where:

The FIGURE provides a simplified process-flow diagram of two serially connected gas-phase reactors for use in some embodiments of ethylene polymerization processes disclosed herein.

It should be understood that the various embodiments are not limited to the arrangements and instrumentality shown in the FIGURE.

DETAILED DESCRIPTION OF THE INVENTION

Figure 1:
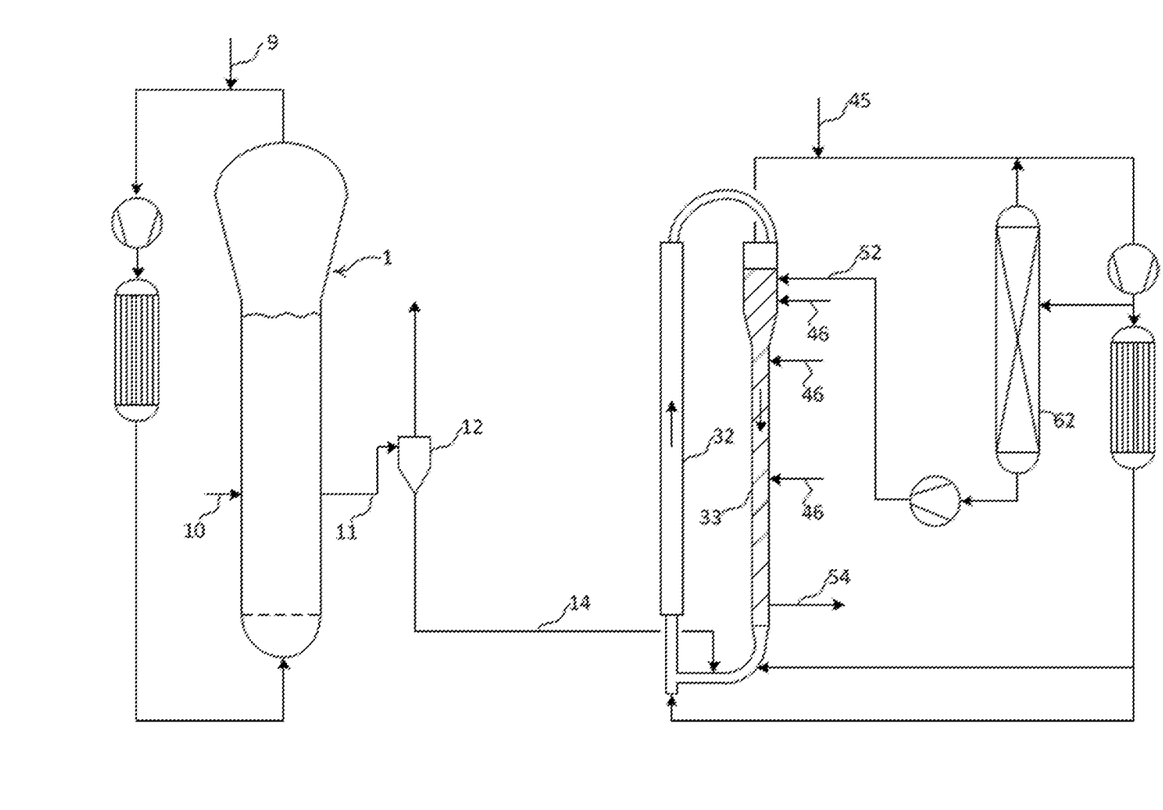

As used herein, the expression "polyethylene composition" embraces, as alternatives, a single ethylene polymer and an ethylene polymer composition. In some embodiments, the ethylene polymer composition is made from or contains two or more ethylene polymer components. In some embodiments, the ethylene polymer components have different molecular weights. In those instances, the ethylene polymer composition is described as "bimodal" or "multimodal".

In some embodiments, the polyethylene composition is made from or contains one or more ethylene copolymers.

The ethylene polymer or ethylene polymer composition has the previously-defined features 1) to 5). In some embodiments, the addition of other components modifies one or more of the features.

The ratio MIF/MIP provides a rheological measure of molecular weight distribution.

Another measure of the molecular weight distribution is provided by the ratio $M_w/M_n$, where $M_w$ is the weight average molecular weight and $M_n$ is the number average molecular weight, measured by GPC (Gel Permeation Chromatography).

In some embodiments, $M_w/M_n$ values for the polyethylene composition range from 12 to 35, alternatively from 14 to 30.

In some embodiments, the $M_w$ values are from 300,000 g/mol to 550,000 g/mol, alternatively from 350,000 g/mol to 450,000 g/mol.

In some embodiments, ranges of LCBI values are:
from 0.75 to 0.95; alternatively
from 0.75 to 0.93; alternatively
from 0.75 to 0.90; alternatively
from 0.80 to 0.95; alternatively
from 0.80 to 0.93; alternatively
from 0.80 to 0.90.

In some embodiments, the present polyethylene composition has at least one of the following additional features.
MIF from 4 to 15 g/10 min., alternatively from 5 to 12 g/10 min.;
ratio ($\eta_{0.02}$/1000)/LCBI, which is between $\eta_{0.02}$ divided by 1000 and LCBI, equal to or greater than 150, alternatively greater than 190, alternatively from 150 to 300, alternatively from 190 to 300, alternatively from 190 to 250;
comonomer content equal to or less than 2% by weight, alternatively from 0.5 to 2% by weight, with respect to the total weight of the composition;
HMWcopo index from 1 to 15, alternatively from 1 to 10, alternatively from 1 to 8.

The HMWcopo index is determined according to the following formula:

$$\text{HMWcopo} = (\eta_{0.02} \times t_{maxDSC})/(10^5)$$

wherein $\eta_{0.02}$ is the complex shear viscosity of the melt in Pa·s, measured at a temperature of 190° C., in a parallel-plate (or plate-plate) rheometer under dynamic oscillatory shear mode with an applied angular frequency of 0.02 rad/s; $t_{maxDSC}$ is the time, in minutes, to reach the maximum value of heat flow (in mW) of crystallization (time at which the maximum crystallization rate is achieved, equivalent to the t½ crystallization half-time) at a temperature of 124° C. under quiescent conditions, measured in isothermal mode in a differential scanning calorimetry apparatus, DSC; and LCBI is the ratio of the measured mean-square radius of gyration $R_g$, measured by GPC-MALLS, to the mean-square radius of gyration for a linear PE having the same molecular weight at a mol. weight of 1,000,000 g/mol.

In some embodiments, the comonomer or comonomers present in the ethylene copolymers are selected from olefins having formula $CH_2=CHR$ wherein R is an alkyl radical, linear or branched, having from 1 to 10 carbon atoms.

In some embodiments, the comonomers are selected from the group consisting of propylene, butene-1, pentene-1, 4-methylpentene-1, hexene-1, octene-1 and decene-1. In some embodiments, the comonomer is hexene-1.

In some embodiments, the present composition is made from or contains:

A) 30-70% by weight, alternatively 40-60% by weight, of an ethylene homopolymer or copolymer with density equal to or greater than 0.960 g/cm³ and melt flow index MIE at 190° C. with a load of 2.16 kg, according to ISO 1133, of 2 g/10 min. or higher, alternatively of 5 g/10 min. or higher and B) 30-70% by weight, alternatively 40-60% by weight, of an ethylene copolymer having a MIE value lower than the MIE value of A), alternatively lower than 0.5 g/10 min.

The above percent amounts are given with respect to the total weight of A)+B). In some embodiments, component A) is an ethylene homopolymer.

In some embodiments, MIE ranges for component A) are.
2 to 20 g/10 min.; alternatively
3 to 20 g/10 min.; alternatively
2 to 15 g/10 min.; alternatively
3 to 15 g/10 min.

In some embodiments, the polyethylene composition is used for producing blow molded articles. In some embodiments, the articles are hollow. Examples of hollow articles are drums, containers, and gasoline storage tanks.

In some embodiments, the polyethylene composition has the following properties.

Environmental stress crack resistance measured by FNCT 4 MPa/80° C. higher than 150 h, alternatively higher than 250 h;
Swell ratio higher than 185%;
Charpy aCN Impact (T=0° C.) of 10 kJ/m² or higher;
Absence of gels having gel diameter of higher than 700 μm.

The details of the test methods are given in the examples.

In some embodiments, the blow-molding process is carried out by first plasticizing the polyethylene composition in an extruder at temperatures in the range from 180 to 250° C. and then extruding the polyethylene composition through a die into a blow mold, wherein the polyethylene composition is cooled.

In some embodiments, the polyethylene composition is prepared without limitation as to polymerization process or catalyst. In some embodiments, the polyethylene composition is prepared by a gas phase polymerization process in the presence of a Ziegler-Natta catalyst.

In some embodiments, the Ziegler-Natta catalyst is made from or contains the product of the reaction of an organometallic compound of group 1, 2 or 13 of the Periodic Table of elements with a transition metal compound of groups 4 to 10 of the Periodic Table of Elements (new notation). In some embodiments, the transition metal compound is selected among compounds of Ti, V, Zr, Cr and Hf. In some embodiments, the transition metal is supported on $MgCl_2$.

In some embodiments, the catalysts are made from or contain the product of the reaction of the organometallic compound of group 1, 2 or 13 of the Periodic Table of elements, with a solid catalyst component made from or containing a Ti compound supported on $MgCl_2$.

In some embodiments, the organometallic compounds are organo-Al compounds.

In some embodiments, the polyethylene composition is obtainable by using a Ziegler-Natta polymerization catalyst, alternatively a Ziegler-Natta catalyst supported on $MgCl_2$, alternatively a Ziegler-Natta catalyst, made from or containing the product of reaction of:

a) a solid catalyst component made from or containing a Ti compound and an electron donor compound ED supported on $MgCl_2$;
b) an organo-Al compound; and optionally
c) an external electron donor compound $ED_{ext}$.

In some embodiments and in component a), the ED/Ti molar ratio ranges from 1.5 to 3.5 and the Mg/Ti molar ratio is higher than 5.5, alternatively from 6 to 80.

In some embodiments, the titanium compounds are tetrahalides or compounds of formula $TiX_n(OR^1)_{4-n}$, where $0 \leq n \leq 3$, X is halogen, alternatively chlorine, and $R^1$ is $C_1$-$C_{10}$ hydrocarbon group. In some embodiments, the titanium compound is titanium tetrachloride.

In some embodiments, the ED compound is selected from alcohol, ketones, amines, amides, nitriles, alkoxysilanes, aliphatic ethers, and esters of aliphatic carboxylic acids.

In some embodiments, the ED compound is selected among amides, esters and alkoxysilanes.

In some embodiments, the ED compounds are esters. In some embodiments, the esters are the alkyl esters of C1-C20 aliphatic carboxylic acids, alternatively C1-C8 alkyl esters of aliphatic mono carboxylic acids. In some embodiments, the C1-C8 alkyl esters of aliphatic mono carboxylic acids are selected from the group consisting of ethylacetate, methyl formiate, ethylformiate, methylacetate, propylacetate, i-propylacetate, n-butylacetate, and i-butylacetate. In some embodiments, the esters are aliphatic ethers, alternatively C2-C20 aliphatic ethers, alternatively tetrahydrofuran (THF) or dioxane.

In the solid catalyst component the $MgCl_2$ is the basic support. In some embodiments, minor amount of additional carriers are used. In some embodiments, $MgCl_2$ is used as such or obtained from Mg compounds used as precursors that are transformed into $MgCl_2$ by the reaction with halogenating compounds. In some embodiments, $MgCl_2$ is used in active form as a support for Ziegler-Natta catalysts. In some embodiments, the use of these compounds in Ziegler-Natta catalysis is as described in U.S. Pat. Nos. 4,298,718 and 4,495,338. In some embodiments, the magnesium dihalides in active form used as support or co-support in components of catalysts for the polymerization of olefins are characterized by X-ray spectra in which the most intense diffraction line that appears in the ASTM-card reference of the spectrum of the non-active halide is diminished in intensity and broadened. In some embodiment and in the X-ray spectra of magnesium dihalides in active form, the most intense line is diminished in intensity and replaced by a halo whose maximum intensity is displaced towards lower angles relative to that of the most intense line.

In some embodiments, the solid catalyst component a) is obtained by first contacting the titanium compound with the $MgCl_2$, optionally in the presence of an inert medium, thereby preparing an intermediate product a') containing a titanium compound supported on $MgCl_2$. In some embodiments, the intermediate product a') is prepared from the solid catalyst component a) obtained by first contacting the titanium compound with a precursor Mg compound, optionally in the presence of an inert medium. In some embodiments, intermediate product a') is then contacted with the ED compound which is added to the reaction mixture alone or in a mixture with other compounds, wherein the ED compound represents the main component, optionally in the presence of an inert medium.

As used herein, the term "main component" refers to the molar amount with respect to the other possible compounds, excluding inert solvents or diluents used to handle the contact mixture. In some embodiments, the ED treated product is subject to washings with the solvents to recover the final product. In some embodiments, the treatment with the ED compound is repeated one or more times.

In some embodiments, a precursor of $MgCl_2$ is used as starting Mg compound. In some embodiments, the precursor is a Mg compound of formula MgR'2 where the R' groups can be independently C1-C20 hydrocarbon groups optionally substituted, OR groups, OCOR groups, chlorine, wherein R is a C1-C20 hydrocarbon groups optionally substituted, with the proviso that the R' groups are not simultaneously chlorine. In some embodiments, the precursors are the Lewis adducts between $MgCl_2$ and Lewis bases. In some embodiments, the precursors are the $MgCl_2$(R"OH)$_m$ adducts in which R" groups are C1-C20 hydrocarbon groups, alternatively C1-C10 alkyl groups, and m is from 0.1 to 6, alternatively from 0.5 to 3, alternatively from 0.5 to 2. In some embodiments, the adducts are obtained by mixing alcohol and $MgCl_2$ in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. In some embodiments, the spherical adducts are prepared as described in U.S. Pat. Nos. 4,469,648, 4,399,054, or Patent Cooperation Treaty Publication No. WO98/44009. In some embodiments, the spherulization is the spray cooling method described in U.S. Pat. Nos. 5,100,849 and 4,829,034.

In some embodiments, the adducts are the $MgCl_2$.(EtOH)$_m$ adducts wherein m is from 0.15 to 1.7 obtained subjecting the adducts with a higher alcohol content to a thermal dealcoholation process carried out in nitrogen flow at temperatures between 50 and 150° C. until the alcohol content is reduced to the above value. In some embodiments, the process is as described in European Patent Application No. EP 395083.

In some embodiments, the dealcoholation is carried out chemically by contacting the adduct with compounds capable to react with the alcohol groups.

In some embodiments, these dealcoholated adducts are characterized by a porosity (measured by mercury method) due to pores with radius up to 0.1 µm ranging from 0.15 to 2.5 cm$^3$/g, alternatively from 0.25 to 1.5 cm$^3$/g.

These adducts are reacted with the $TiX_n(OR^1)_{4-n}$ compound (or possibly mixtures thereof) mentioned above. In some embodiments, the adducts are reacted with titanium tetrachloride. In some embodiments, the reaction with the Ti compound is carried out by suspending the adduct in $TiCl_4$. In some embodiments, the $TiCl_4$ is cold. The mixture is heated up to temperatures ranging from 80-130° C. and kept at this temperature for 0.5-2 hours. In some embodiments, the treatment with the titanium compound is carried out one or more times. In some embodiments, the treatment is repeated twice. In some embodiments, the treatment is carried out in the presence of an electron donor compound.

At the end of the process the solid is recovered by separation of the suspension. In some embodiments, the separation is by settling and removing of the liquid, filtration, or centrifugation. In some embodiments, the solid is to washings with solvents. In some embodiments, the washings are carried out with inert hydrocarbon liquids. In some embodiments, more polar solvents are used. In some embodiments, the more polar solvent have a higher dielectric constant. In some embodiments, the polar solvents are halogenated hydrocarbons.

The intermediate product is then brought into contact with the ED compound under conditions able to fix an amount of donor on the solid. The amount of donor used is variable. In some embodiments, the donor is used in molar ratio with respect to the Ti content in the intermediate product ranging from 0.5 to 20, alternatively from 1 to 10. In some embodiments, the contact is carried out in a liquid medium such as a liquid hydrocarbon. In some embodiments, temperature at which the contact takes place varies depending on the nature of the reagents. In some embodiments, the temperature is in the range from −10° to 150° C., alternatively from 0° to 120° C. Temperatures causing the decomposition or degradation of any specific reagents should be avoided even if temperatures fall within the range. In some embodiments, the time of the treatment varies based upon other conditions such as nature of the reagents, temperature, and concentration. In some embodiments, this contact step lasts from 10 minutes to 10 hours, alternatively from 0.5 to 5 hours. In some embodiments and to further increase the final donor content, this step is repeated one or more times. At the end of this step the solid is recovered by separation of the suspension. In some embodiments, the separation is by settling and removing of the liquid, filtration, or centrifugation. In some embodiments, the solid is subject to washings with solvents. In some embodiments, the washings are carried out with inert hydrocarbon liquids. In some embodiments, more polar solvents are used. In some embodiments, the more polar solvents have a higher dielectric constant. In some embodiments, the polar solvents are halogenated or oxygenated hydrocarbons.

The solid catalyst component is converted into catalysts for the polymerization of olefins by reacting the solid catalyst component with an organometallic compound of group 1, 2 or 13 of the Periodic Table of elements, alternatively with an Al-alkyl compound.

In some embodiments, the alkyl-Al compound is selected from the group consisting of trialkyl aluminum compounds, alkylaluminum halides, alkylaluminum hydrides, alkylaluminum sesquichlorides and mixtures thereof. In some embodiments, the trialkyl aluminum compounds is selected from the group consisting of triethylaluminum, triisobutylaluminum, tri-n-butylaluminum, tri-n-hexylaluminum, and tri-n-octylaluminum. In some embodiments, the alkylaluminum sesquichlorides are selected from the group consisting of $AlEt_2Cl$ and $Al_2Et_3Cl_3$.

In some embodiments, the external electron donor compound $ED_{ext}$ optionally used to prepare the Ziegler-Natta catalysts is equal to or different from the ED used in the solid catalyst component a). In some embodiments, the external electron donor compound is selected from the group consisting of ethers, esters, amines, ketones, nitriles, silanes and their mixtures. In some embodiments, the external electron donor compound is selected from the C2-C20 aliphatic ethers, alternatively cyclic ethers, alternatively cyclic ethers having 3-5 carbon atoms. In some embodiments, the cyclic ether is selected from the group consisting of tetrahydrofurane and dioxane.

In some embodiments, the catalyst is pre-polymerized by producing reduced amounts of polyolefin, alternatively polypropylene or polyethylene. In some embodiments, the intermediate product a') is subject to pre-polymerization before adding the electron donor compound ED. In some embodiments, the solid catalyst component a) is subject to pre-polymerization.

In some embodiments, the amount of prepolymer produced is up to 500 g per g of intermediate product a') or of component a). Alternatively, the amount of prepolymer produced is from 0.5 to 20 g per g of intermediate product a').

In some embodiments, the prepolymerization is carried out with the use of a cocatalyst such as organoaluminum compounds. In some embodiments, the cocatalyst is in combination with an external electron donor compound as discussed above.

In some embodiments, the pre-polymerization is carried out at temperatures from 0 to 80° C., alternatively from 5 to 70° C., in the liquid or gas phase.

In some embodiments, the previously-described catalysts are used when the intermediate product a') is subjected to pre-polymerization.

In some embodiments, the process includes the following steps, in any mutual order:

a) polymerizing ethylene, optionally together with one or more comonomers, in a gas-phase reactor in the presence of hydrogen;
b) copolymerizing ethylene with one or more comonomers in another gas-phase reactor in the presence of an amount of hydrogen less than step a);

wherein, in at least one of the gas-phase reactors, the growing polymer particles flow upward through a first polymerization zone (riser) under fast fluidization or transport conditions, leave the riser and enter a second polymerization zone (downcomer) through which the growing polymer particles flow downward under the action of gravity, leave the downcomer and are reintroduced into the riser, thereby establishing a circulation of polymer between the two polymerization zones.

In the first polymerization zone (riser), fast fluidization conditions are established by feeding a gas mixture made from or containing one or more olefins (ethylene and comonomers) at a velocity higher than the transport velocity of the polymer particles. In some embodiments, the velocity of the gas mixture is between 0.5 and 15 m/s, alternatively between 0.8 and 5 m/s. As used herein, the terms "transport velocity" and "fast fluidization conditions" are as defined in "D. Geldart, Gas Fluidisation Technology, page 155 et seq., J. Wiley & Sons Ltd., 1986".

In the second polymerization zone (downcomer), the polymer particles flow under the action of gravity in a densified form, so that high values of density of the solid are reached (mass of polymer per volume of reactor), which approach the bulk density of the polymer.

In other words, the polymer flows vertically down through the downcomer in a plug flow (packed flow mode), so that minor quantities of gas are entrained between the polymer particles.

In some embodiments, an ethylene polymer obtain from step a) has a molecular weight lower than the ethylene copolymer obtained from step b).

In some embodiments, a copolymerization of ethylene to produce a relatively low molecular weight ethylene copolymer (step a) is performed upstream the copolymerization of ethylene to produce a relatively high molecular weight ethylene copolymer (step b). In some embodiments and in step a), a gaseous mixture made from or containing ethylene, hydrogen, comonomer and an inert gas is fed to a first gas-phase reactor, alternatively a gas-phase fluidized bed reactor. The polymerization is carried out in the presence of the previously described Ziegler-Natta catalyst.

Hydrogen is fed in an amount depending on the specific catalyst used and to obtain in step a) an ethylene polymer with a melt flow index MIE of 5 g/10 min. or higher. To obtain the above MIE range, in step a) the hydrogen/ethylene molar ratio is indicatively from 0.8 to 3, the amount of ethylene monomer being from 2 to 20% by volume, alternatively from 5 to 15% by volume, based on the total volume of gas present in the polymerization reactor. The remaining portion of the feeding mixture is represented by inert gases and one or more comonomers, if any. To dissipate the heat generated by the polymerization reaction, inert gases are used and selected from nitrogen or saturated hydrocarbons, alternatively propane.

The operating temperature in the reactor of step a) is selected between 50 and 120° C., alternatively between 65 and 100° C., while the operating pressure is between 0.5 and 10 MPa, alternatively between 2.0 and 3.5 MPa.

In some embodiments, the ethylene polymer obtained in step a) represents from 30 to 70% by weight of the total ethylene polymer produced in the overall process, that is, in the first and second serially connected reactors.

The ethylene polymer coming from step a) and the entrained gas are then passed through a solid/gas separation step to prevent the gaseous mixture coming from the first polymerization reactor from entering the reactor of step b) (second gas-phase polymerization reactor). In some embodiments, the gaseous mixture is recycled back to the first polymerization reactor while the separated ethylene polymer is fed to the reactor of step b). A point of feeding of the polymer into the second reactor is on the connecting part between the downcomer and the riser, wherein the solid concentration is low and thereby avoiding a negative impact on the flow conditions.

The operating temperature in step b) is in the range of 65 to 95° C., and the pressure is in the range of 1.5 to 4.0 MPa. In some embodiments, the second gas-phase reactor produces a high molecular weight ethylene copolymer by copolymerizing ethylene with one or more comonomers. In some embodiments and to broaden the molecular weight distribution of the final ethylene polymer, the reactor of step b) is operated by establishing different conditions of monomers and hydrogen concentration within the riser and the downcomer.

In some embodiments and in step b), the gas mixture entraining the polymer particles and coming from the riser is partially or totally prevented from entering the downcomer, thereby obtaining two different gas composition zones. In some embodiments, a gas and/or liquid mixture is fed into the downcomer through a line placed at a point of the downcomer; alternatively, the feeding point is in the upper part thereof. The gas and/or liquid mixture has a composition that differs from the gas mixture present in the riser. In some embodiments, the flow of the gas and/or liquid mixture is regulated so that an upward flow of gas counter-current to the flow of the polymer particles is generated and acts as a barrier to the gas mixture entrained among the polymer particles coming from the riser. In some embodiments, the flow is counter-current at the top of the riser. In some embodiments, a mixture with low content of hydrogen is fed to produce the higher molecular weight polymer fraction in the downcomer. In some embodiments, one or more comonomers are fed to the downcomer of step b), optionally together with ethylene, propane or other inert gases.

The hydrogen/ethylene molar ratio in the downcomer of step b) is between 0.005 and 0.2, the ethylene concentration is from 0.5 to 15%, alternatively 0.5-10%, by volume, the comonomer concentration is from 0.1 to 1.5% by volume, based on the total volume of gas present in the downcomer. The rest is propane or other inert gases. In some embodiments, because a low molar concentration of hydrogen is present in the downcomer, a relatively high amount of comonomer is bond to the high molecular weight polyethylene fraction.

The polymer particles coming from the downcomer are reintroduced in the riser of step b).

In some embodiments and because the polymer particles continues reacting and additional comonomer is not fed to the riser, the concentration of the comonomer drops to a range of 0.1 to 1.2% by volume, based on the total volume of gas present in the riser. The comonomer content is controlled to obtain the density of the final polyethylene. In the riser of step b) the hydrogen/ethylene molar ratio is in the range of 0.01 to 0.5, the ethylene concentration being between 5 and 20% by volume based on the total volume of gas present in the riser. The rest is propane or other inert gases.

In some embodiments, the polymerization process is as described in Patent Cooperation Treaty Publication No. WO2005019280.

EXAMPLES

The practice of the various embodiments, compositions and methods as provided herein are disclosed below in the following examples. These Examples are illustrative and are not intended to limit the scope of the appended claims in any manner whatsoever.

The following analytical methods are used to characterize the polymer compositions.

Density

Determined according to ISO 1183 at 23° C.

Complex Shear Viscosity $\eta_{0.02}$ (eta (0.02))

Measured at angular frequency of 0.02 rad/s and 190° C. as follows.

Samples were melt-pressed for 4 min under 200° C. and 200 bar into plates of 1 mm thickness. Disc specimens of a diameter of 25 mm were stamped and inserted in the rheometer, which was pre-heated at 190° C. The measurement was performed using a rotational rheometer. Here the Anton Paar MCR 300 is utilized, with a plate-plate geometry. A frequency-sweep was performed (after 4 min of annealing the sample at the measurement temperature) at T=190° C., under constant strain-amplitude of 5%, measuring and analyzing the stress response of the material in the range of excitation frequencies $\omega$ from 628 to 0.02 rad/s. The standardized basic software was utilized to calculate the rheological properties, that is, the storage-modulus, G', the loss-modulus, G", the phase lag $\delta$ (=arctan(G"/G')) and the complex viscosity, $\eta^*$, as a function of the applied frequency, namely $\eta^*(\omega)=[G'(\omega)^2+G"(\omega)^2]^{1/2}/\omega$. The value of the latter at an applied frequency $\omega$ of 0.02 rad/s was the $\eta_{0.02}$.

HMWcopo Index

To quantify the crystallization and processability potential of the polymer, the HMWcopo (High Molecular Weight Copolymer) Index was used, which is defined by the following formula:

$$HMWcopo=(\eta_{0.02} \times t_{maxDSC})/(10^5)$$

The $t_{maxDSC}$ is determined using a Differential Scanning Calorimetry apparatus, TA Instruments Q2000, under isothermal conditions at a constant temperature of 124° C. 5-6 mg of sample were weighed and brought into the aluminum DSC pans. The sample was heated with 20 K/min up to 200° C. and cooled down also with 20 K/min to the test temperature to erase the thermal history. The isothermal test began immediately after and the time was recorded until crystallization occurred. The time interval until the crystallization heat flow maximum (peak), $t_{maxDSC}$, was determined using the vendor software (TA Instruments). The measurement was repeated 3× times and an average value was then calculated (in min). If no crystallization was observed under these conditions for more than 120 minutes, the value of $t_{maxDSC}$=120 minutes was used for further calculations of the HMWcopo index.

The melt viscosity $\eta_{0.02}$ value was multiplied by the $t_{maxDSC}$ value and the product was normalized by a factor of 100000 ($10^5$).

Molecular Weight Distribution Determination

The determination of the molar mass distributions and the means Mn, Mw, Mz and Mw/Mn derived therefrom was carried out by high-temperature gel permeation chromatography using a method described in ISO 16014-1, -2, -4, issues of 2003. The specifics according to the mentioned ISO standards were as follows: Solvent 1,2,4-trichlorobenzene (TCB), temperature of apparatus and solutions 135° C. and as concentration detector a PolymerChar (Valencia, Paterna 46980, Spain) IR-4 infrared detector, capable for use with TCB. A WATERS Alliance 2000 equipped with the following pre-column SHODEX UT-G and separation columns SHODEX UT 806 M (3×) and SHODEX UT 807 (Showa Denko Europe GmbH, Konrad-Zuse-Platz 4, 81829 Muenchen, Germany) connected in series was used.

The solvent was vacuum distilled under nitrogen and stabilized with 0.025% by weight of 2,6-di-tert-butyl-4-methylphenol. The flowrate used was 1 ml/min; the injection was 500 µl, and the polymer concentration was in the range of 0.01%<conc.<0.05% w/w. The molecular weight calibration was established by using monodisperse polystyrene (PS) standards from Polymer Laboratories (now Agilent Technologies, Herrenberger Str. 130, 71034 Boeblingen, Germany)) in the range from 580 g/mol up to 11600000 g/mol and additionally with Hexadecane.

The calibration curve was then adapted to Polyethylene (PE) by the Universal Calibration method (Benoit H., Rempp P. and Grubisic Z., & in J. Polymer Sci., Phys. Ed., 5, 753(1967)). The Mark-Houwing parameters were for PS: $k_{PS}$=0.000121 dl/g, $\alpha_{PS}$=0.706 and for PE $k_{PE}$=0.000406 dl/g, $\alpha_{PE}$=0.725, valid in TCB at 135° C. Data recording, calibration and calculation were carried out using NTGPC_Control_V6.02.03 and NTGPC_V6.4.24 (hs GmbH, Hauptstraße 36, D-55437 Ober-Hilbersheim, Germany) respectively.

Melt Flow Index

Determined according to ISO 1133 at 190° C. with the specified load.

Long Chain Branching Index (LCBI)

The LCB index corresponds to the branching factor g', measured for a molecular weight of $10^6$ g/mol. The branching factor g', which allows determining long-chain branches at high Mw, was measured by Gel Permeation Chromatography (GPC) coupled with Multi-Angle Laser-Light Scattering (MALLS). The radius of gyration for each fraction eluted from the GPC (with a flow-rate of 0.6 ml/min and a column packed with 30 μm particles) was measured by analyzing the light scattering at the different angles with the MALLS (detector Wyatt Dawn EOS, Wyatt Technology, Santa Barbara, Calif.). A laser source of 120 mW of wavelength 658 nm was used. The specific index of refraction was taken as 0.104 ml/g. Data evaluation was done with Wyatt ASTRA 4.7.3 and CORONA 1.4 software. The LCB Index was determined as follows:

The parameter g' is the ratio of the measured mean square radius of gyration to that of a linear polymer having the same molecular weight. Linear molecules show g' of 1 while values less than 1 indicate the presence of LCB. Values of g' as a function of mol. weight, M, were calculated from the equation:

$$g'(M) = <Rg^2>_{sample,M} / <Rg^2>_{linear\ ref,M}$$

where $<Rg^2>$, M is the root-mean-square radius of gyration for the fraction of mol. weight M.

The radius of gyration for each fraction eluted from the GPC (with a flow-rate of 0.6 ml/min and a column packed with 30 μm particles) was measured by analyzing the light scattering at the different angles. Therefore, from this MALLS setup, mol. weight M and $<Rg^2>_{sample,M}$ were determined and g' at a measured M=$10^6$ g/mol was defined. The $<Rg^2>_{linear\ ref,M}$ was calculated by the relation between radius-of-gyration and molecular weight for a linear polymer in solution (Zimm and Stockmayer W H 1949)) and confirmed by measuring a linear PE reference with the same apparatus and methodology described.

The same protocol is described in the following documents.

Zimm B H, Stockmayer W H (1949) *The dimensions of chain molecules containing branches and rings*. J Chem Phys 17

Rubinstein M., Colby R H. (2003), *Polymer Physics*, Oxford University Press

Comonomer Content

The comonomer content was determined by IR in accordance with ASTM D 6248 98, using an FT-IR spectrometer Tensor 27 from Bruker, calibrated with a chemometric model for determining ethyl- or butyl-side-chains in PE for butene or hexene as comonomer, respectively. The result was compared to the estimated comonomer content derived from the mass-balance of the polymerization process.

Swell Ratio

The Swell-ratio of the studied polymers was measured utilizing a capillary rheometer, Göttfert Rheotester2000 and Rheograph25, at T=190° C., equipped with a commercial 30/2/2/20 die (total length 30 mm, Active length=2 mm, diameter=2 mm, L/D=2/2 and 20° entrance angle) and an optical device (laser-diod from Göttfert) for measuring the extruded strand thickness. The sample was melted in the capillary barrel at 190° C. for 6 min and extruded with a piston velocity corresponding to a resulting shear-rate at the die of 1440 $s^{-1}$.

The extrudate was cut (by an automatic cutting device from Göttfert) at a distance of 150 mm from the die-exit, at the moment the piston reached a position of 96 mm from the die-inlet. The extrudate diameter was measured with the laser-diod at a distance of 78 mm from the die-exit, as a function of time. The maximum value corresponded to the $D_{extrudate}$. The swell-ratio was determined from the calculation:

$$SR = (D_{extrudate} - D_{die}) 100\% / D_{die}$$

where $D_{die}$ was the corresponding diameter at the die exit, measured with the laser-diode.

Notched Tensile Impact Test AZK

The tensile-impact strength was determined using ISO 8256:2004 with type 1 double notched specimens according to method A. The test specimens (4×10×80 mm) were cut from a compression molded sheet which was prepared according ISO 1872-2 (average cooling rate 15 K/min and high pressure during cooling phase). The test specimens were notched on two sides with a 450 V-notch. Depth was 2±0.1 mm and curvature radius on notch dip was 1.0±0.05 mm.

The free length between grips was 30±2 mm. Before measurement, test specimens were conditioned at a constant temperature of −30° C. over a period of from 2 to 3 hours. The procedure for measurements of tensile impact strength including energy correction following method A is described in ISO 8256.

ESCR Belltest

Environmental Stress Crack Resistance (ESCR Bell Telephone Test) was measured according to ASTM D1693:2013 (Method B) and DIN EN ISO 22088-3:2006. 10 rectangular test specimens (38×13×2 mm) were cut from a compression-molded sheet, which was prepared according to ISO 1872-2 (average cooling rate 15 K/min and high pressure during cooling phase). The specimen were notched with a razor to a depth of 0.4 mm parallel to the longitudinal axes, centered on one of the broad faces. Afterward the specimen were bent in a U-shape with a bending device, with the notched side pointing upwards. Within 10 minutes from bending, the U-shaped specimens were put into a glass tube and filled with a 10% vol. aqueous solution of 4-Nonylphenyl-polyethylene glycol (Arkopal N100) at 50° C. and sealed with a rubber stopper. The specimen were inspected visually for cracks hourly on the first day, then daily and after 7 days on a weekly basis (on 168 h increments). The final value was the 50% failure point ($F_{50}$) of the 10 test specimen in the glass tube.

Environmental Stress Cracking Resistance According to Full Notch Creep Test (FNCT)

The environmental stress cracking resistance of polymer samples was determined in accordance to international standard ISO 16770 (FNCT) in aqueous surfactant solution. From the polymer sample a compression-molded 10 mm thick sheet was prepared. The bars with squared cross section (10×10×100 mm) were notched using a razor blade on four sides perpendicularly to the stress direction. A notching device described in M. Fleissner in Kunststoffe 77 (1987), pp. 45 was used for the sharp notch with a depth of 1.6 mm.

The load applied was calculated from tensile force divided by the initial ligament area. Ligament area was the remaining area=total cross-section area of specimen minus the notch area. For FNCT specimen: 10×10 $mm^2$—4 times—of trapezoid notch area=46.24 $mm^2$ (the remaining cross-section for the failure process/crack propagation). The test specimen was loaded according to ISO 16770 with constant load of 4 MPa at 80° C. in a 2% (by weight) water solution of non-ionic surfactant ARKOPAL N100. Time until rupture of test specimen was detected.

Charpy aCN

Fracture toughness determination by an internal method on test bars measuring 10×10×80 mm cut from a compression-molded sheet with a thickness of 10 mm. Six of these test bars were notched in the center using a razor blade in the notching device mentioned above for FNCT. The notch depth was 1.6 mm. The measurement was carried out with the Charpy measurement method under ISO 179-1, with modified test specimens and modified impact geometry (distance between supports).

All test specimens were conditioned to the measurement temperature of −30° C. over a period of from 2 to 3 hours. A test specimen was then placed without delay onto the support of a pendulum impact tester in accordance with ISO 179-1. The distance between the supports was 60 mm. The drop of the 2 J hammer was triggered, with the drop angle being set to 1600, the pendulum length to 225 mm and the impact velocity to 2.93 m/s. The fracture toughness value was expressed in $kJ/m^2$ and given by the quotient of the impact energy consumed and the initial cross-sectional area at the notch, aCN. Values for complete fracture and hinge fracture were used (see suggestion by ISO 179-1).

Cast Film Measurement

The Film Note measurement was carried out on an OCS extruder type ME 202008-V3 with 20 mm screw diameter and a screw length of 25 D with a slit die width of 150 mm. The cast line was equipped with a chill roll and winder (model OCS CR-9). The optical equipment consisted of a OSC film surface analyzer camera, model FTA-100 (flash camera system) with a resolution of 26 µm×26 µm. After purging the resin first for 1 hour to stabilize the extrusion conditions, inspection and value recording took place for 30 minutes afterwards. The resin was extruded at 220° C. with a take-off speed of ca. 2.7 m/min to generate a film with thickness 50 µm. The chill roll temperature was 70° C.

The inspection with the surface analyzer camera provided the total content of gels and the content of gels with diameter of higher than 700 µm, as reported in Table 1.

Process Setup

The polymerization process was carried out under continuous conditions in a plant including two serially connected gas-phase reactors, as shown in the FIGURE.

The polymerization catalyst was prepared as follows.

Procedure for the Preparation of the Catalyst Component

A magnesium chloride and alcohol adduct containing about 3 mols of alcohol was prepared following the method described in example 2 of U.S. Pat. No. 4,399,054, but working at 2000 RPM instead of 10000 RPM. The adduct was subjected to a thermal treatment, under nitrogen stream, over a temperature range of 50-150° C. until a weight content of 25% of alcohol was reached.

Into a 2 L four-necked round flask, purged with nitrogen, 1 L of $TiCl_4$ was introduced at 0° C. Then, at the same temperature, 70 g of a spherical $MgCl_2$/EtOH adduct containing 25% wt of ethanol were added under stirring. The temperature was raised to 140° C. in 2 h and maintained for 120 minutes. Then, the stirring was discontinued; the solid product was allowed to settle. and the supernatant liquid was siphoned off. The solid residue was then washed once with heptane at 80° C. and five times with hexane at 25° C. and dried under vacuum at 30° C.

Into a 260 $cm^3$ glass reactor provided with stirrer, 351.5 $cm^3$ of hexane at 20° C. and, under stirring, 7 g of the catalyst component were introduced at 20° C. Keeping constant the internal temperature, 5.6 $cm^3$ of tri-n-octylaluminum (TNOA) in hexane (about 370 g/l) and an amount of cyclohexylmethyl-dimethoxysilane (CMMS) such as to have molar ratio TNOA/CMMS of 50, were slowly introduced into the reactor and the temperature was brought to 10° C. After 10 minutes stirring, 10 g of propylene were carefully introduced into the reactor at the same temperature during a time of 4 hours. The consumption of propylene in the reactor was monitored and the polymerization was discontinued when a theoretical conversion of 1 g of polymer per g of catalyst was deemed to be reached. The content was filtered and washed three times with hexane at a temperature of 30° C. (50 g/l). After drying, the resulting pre-polymerized catalyst was analyzed and found to contain 1.05 g of polypropylene per g of initial catalyst, 2.7% Ti, 8.94% Mg and 0.1% Al.

Internal Electron Donor Supportation on the Prepolymerized Catalyst

About 42 g of the solid pre-polymerized catalyst were charged in a glass reactor purged with nitrogen and slurried with 0.8 L of hexane at 50° C.

Then, ethyl acetate was carefully added dropwise (in 10 minutes) to have a molar ratio of 1.7 between Mg of the pre-polymerized catalyst and the organic Lewis base.

The slurry was kept under stirring for 2 h still having 50° C. as internal temperature.

After that the stirring was stopped, the solid was allowed to settle. A single hexane wash was performed at room temperature before recovering and drying the final catalyst.

Example 1

Polymerization 8.9 g/h of the solid catalyst with a molar feed ratio of electron donor/Ti of 8, were fed using 5 kg/h of liquid propane to a first stirred precontacting vessel, into which also triisobuthylaluminum (TIBA), diethylaluminumchloride (DEAC) and the electron donor tetrahydrofuran (THF) were dosed. The weight ratio between trisiobutylaluminum and diethylaluminumchloride was 7:1. The ratio between aluminum alkyls (TIBA+DEAC) to the solid catalyst was 5:1. The weight ratio of alkyls to THF was 70. The first precontacting vessel was kept at 50° C. with an average residence time of 30 minutes. The catalyst suspension of the first precontacting vessel was continuously transferred to a second stirred precontacting vessel, which was operated with an average residence time of 30 minutes and kept also at 50° C. The catalyst suspension was then transferred continuously to fluidized-bed reactor (FBR) (1) via line (10).

In the first reactor ethylene was polymerized using $H_2$ as molecular weight regulator and in the presence of propane as inert diluent. 42 kg/h of ethylene and 100 g/h of hydrogen were fed to the first reactor via line 9. No comonomer was fed to the first reactor.

The polymerization was carried out at a temperature of 80° C. and at a pressure of 2.9 MPa. The polymer obtained in the first reactor was discontinuously discharged via line 11, separated from the gas into the gas/solid separator 12, and reintroduced into the second gas-phase reactor via line 14.

The polymer produced in the first reactor had a melt index MIE of about 12 g/10 min and a density of 0.965 $g/cm^3$.

The second reactor was operated under polymerization conditions of about 80° C., and a pressure of 2.5 MPa. The riser had an internal diameter of 200 mm and a length of 19 m. The downcomer had a total length of 18 m, an upper part of 5 m with an internal diameter of 300 mm and a lower part of 13 m with an internal diameter of 150 mm. To broaden the molecular weight distribution of the final ethylene polymer, the second reactor was operated by establishing different conditions of monomers and hydrogen concentration within the riser 32 and the downcomer 33. The different conditions were achieved by feeding 330 kg/h of a liquid stream (liquid barrier) via line 52 into the upper part of the downcomer 33. The liquid stream has a composition different from that of the gas mixture present in the riser. The different concentrations of monomers and hydrogen within the riser, the downcomer of the second reactor and the composition of the liquid barrier are indicated in Table 1. The liquid stream of line 52 came from the bottom of a distillation column 62, wherein a part of the recycle stream was separated in a liquid and a gaseous fraction. As shown in the FIGURE, a pump was placed downstream the distillation column 62. The monomers to the downcomer were fed in 3 positions (lines 46). In dosing point 1, located just below the barrier, 12 kg/h of ethylene and 1.15 kg/h of 1-hexene were introduced. In dosing point 2, located 2.3 meters below dosing point 1, 3 kg/h of ethylene were introduced. In dosing point 3, located 4 meters below dosing point 2, 3 kg/h of ethylene were introduced. In each of the 3 dosing points, a liquid taken from stream 52 was additionally fed in ratio to ethylene of 1:1. 5 kg/h of propane, 22.3 kg/h of ethylene and 30 g/h of hydrogen were fed through line 45 into the recycling system.

The final polymer was discontinuously discharged via line 54.

The polymerization process in the second reactor produced relatively high molecular weight polyethylene fractions. In Table 1 the properties of the final product are specified.

The first reactor produced around 50% by weight (split wt %) of the total amount of the final polyethylene resin produced by both first and second reactors.

The comonomer (hexene-1) amount was about 1.2% by weight.

Comparative Example 1

The polymer of this comparative example was a polyethylene composition produced in gas phase with a chromium-containing catalyst and sold with trademark Lupolen 4261AG UV 60005 by LyondellBasell.

TABLE 1

|  | Ex. 1 | Comp. 1 |
| --- | --- | --- |
| Operative conditions first reactor |  |  |
| $H_2/C_2H_4$ Molar ratio | 1.2 | — |
| $C_2H_4$ % | 10.5 | — |
| Density of A) (g/cm$^3$) | 0.967 | — |
| MIE [2.16 kg] of A) (g/10 min.) | 12 | — |
| Split (wt. %) | 50 | — |
| Operative conditions second reactor |  |  |
| $H_2/C_2H_4$ Molar ratio riser | 0.25 | — |
| $C_2H_4$ % riser | 12.2 | — |
| $C_6H_{12}$ % riser | 0.57 | — |
| $H_2/C_2H_4$ Molar ratio downcomer | 0.010 | — |
| $C_2H_4$ % downcomer | 8.6 | — |
| $C_6H_{12}$ % downcomer | 0.84 | — |
| $H_2/C_2H_4$ Molar ratio barrier | 0.009 | — |
| $C_2H_4$ % barrier | 7.8 | — |
| $C_6H_{12}$ % barrier | 0.89 | — |
| Final Polymer properties |  |  |
| MIP [5 kg] (g/10 min.) | 0.29 | 0.30 |
| MIF [21.6 kg] (g/10 min.) | 7.5 | 6.1 |
| MIF/MIP | 25.8 | 20.1 |
| Density (g/cm$^3$) | 0.9485 | 0.9452 |
| Swell ratio (%) | 200 | 202 |
| Mw (g/mol) | 408,109 | 358,112 |
| Mz (g/mol) | 3,028,050 | 3,911,139 |
| Mw/Mn | 26.3 | 21.1 |
| LCBI | 0.87 | 0.90 |
| Comonomer content IR (% by weight) | 1.2 | 1 ($C_6H_{12}$) |
| $\eta_{0.02}$ | 191,887 | 156,083 |
| ($\eta_{0.02}$/1000)/LCBI | 220 | 173.425 |
| AZK −30° C. (kJ/m$^2$) | 153 | 152 |
| Charpy aCN, T = −30° C. (kJ/m$^2$) | 15.8 |  |
| Belltest at 50° C. (hours) | >6000 | 850 |
| FNCT* 4 MPa/80° C. (hours) | 250 | 30.4 |
| Sum Gels/m$^2$ >700 μm | 0 | 0 |
| Sum Gels/m$^2$ total | 277 | 1261 |
| HMW COPO Index |  | 29.5 |

Notes:
$C_2H_4$ = ethylene;
$C_6H_{12}$ = hexene;
*aqueous solution of 2% Arkopal N100

What is claimed is:

1. A polyethylene composition having the following features:
   1) density from 0.940 to 0.951 g/cm$^3$ determined according to ISO 1183 at 23° C.;
   2) ratio MIF/MIP from 12 to 30, where MIF is the melt flow index at 190° C. with a load of 21.60 kg and MIP is the melt flow index at 190° C. with a load of 5 kg, both determined according to ISO 1133;
   3) Mz from 2,500,000 to 4,500,000 g/mol, where Mz is the z-average molecular weight measured by GPC;
   4) $\eta_{0.02}$ from 160,000 to 300,000 Pa·s, wherein $\eta_{0.02}$ is the complex shear viscosity at an angular frequency of 0.02 rad/s, measured with dynamic oscillatory shear in a plate-plate rotational rheometer at a temperature of 190° C.;
   5) long-chain branching index, LCBI, of 0.75 to 0.95, wherein LCBI is the ratio of the measured mean-square radius of gyration $R_g$, measured by GPC-MALLS, to the mean-square radius of gyration for a linear PE having the same molecular weight; and
   6) a swell ratio higher than 185%.

2. The polyethylene composition of claim 1 comprising: one or more ethylene copolymers.

3. The polyethylene composition of claim 1 prepared with a Ziegler-Natta polymerization catalyst.

4. The polyethylene composition of claim 3, wherein the Ziegler-Natta polymerization catalyst comprises:
   the product of reaction of:
   a) a solid catalyst component comprising a Ti compound supported on $MgCl_2$, the component being obtained by contacting the titanium compound with the $MgCl_2$, or a precursor Mg compound, optionally in the presence of an inert medium, thereby obtaining an intermediate product a'), then subjecting a') to pre-polymerization and contact with an electron donor compound;
   b) an organo-Al compound; and optionally
   c) an external electron donor compound.

5. The polyethylene composition of claim 1, having at least one of the following additional features:
   MIF from 4 to 15 g/10 min.;
   ratio ($\eta_{0.02}$/1000)/LCBI, which is between $\eta_{0.02}$ divided by 1000 and LCBI, equal to or greater than 150;
   comonomer content equal to or less than 2% by weight, with respect to the total weight of the composition; and
   HMWcopo index from 1 to 15;
   wherein the HMWcopo index is determined according to the following formula:

$$\text{HMWcopo} = (\eta_{0.02} \times t_{maxDSC})/(10^5)$$

wherein
   $\eta_{0.02}$ is the complex shear viscosity of the melt in Pa·s, measured at a temperature of 190° C., in a parallel-plate rheometer under dynamic oscillatory shear mode with an applied angular frequency of 0.02 rad/s;

$t_{max}$DSC is the time, in minutes, to reach the maximum value of heat flow (in mW) of crystallization (time at which the maximum crystallization rate is achieved, equivalent to the $t\frac{1}{2}$ crystallization half-time) at a temperature of 124° C. under quiescent conditions, measured in isothermal mode in a differential scanning calorimetry apparatus, DSC; and LCBI is the ratio of the measured mean-square radius of gyration Rg, measured by GPC-MALLS, to the mean-square radius of gyration for a linear PE having the same molecular weight at a mol. weight of 1,000,000 g/mol.

6. The polyethylene composition of claim 1, comprising:

A) 30-70% by weight of an ethylene homopolymer or copolymer with density equal to or greater than 0.960 g/cm³ and melt flow index MIE at 190° C. with a load of 2.16 kg, according to ISO 1133, of 2 g/10 min. or higher and B) 30-70% by weight of an ethylene copolymer having a MIE value lower than the MIE value of A).

7. An article of manufacture comprising: the polyethylene composition of claim 1.

8. The article of manufacture according to claim 7, being a blow-molded hollow article.

9. A process for preparing the polyethylene composition of claim 1, comprising:

polymerization steps carried out in the presence of a Ziegler-Natta polymerization catalyst supported on $MgCl_2$.

10. The process of claim 9, comprising the following polymerization steps, in any mutual order:

a) polymerizing ethylene, optionally together with one or more comonomers, in a gas-phase reactor in the presence of hydrogen;

b) copolymerizing ethylene with one or more comonomers in another gas-phase reactor in the presence of an amount of hydrogen less than step a);

wherein, in at least one of the gas-phase reactors, the growing polymer particles flow upward through a first polymerization zone (riser) under fast fluidization or transport conditions, leave the riser and enter a second polymerization zone through which the growing polymer particles flow downward under the action of gravity, leave the second polymerization zone and are reintroduced into the first polymerization zone, thereby establishing a circulation of polymer between the two polymerization zones.

* * * * *

UNITED STATES PATENT AND TRADEMARK OFFICE
CERTIFICATE OF CORRECTION

| | |
|---|---|
| PATENT NO. | : 11,479,660 B2 |
| APPLICATION NO. | : 16/461862 |
| DATED | : October 25, 2022 |
| INVENTOR(S) | : Doetsch et al. |

It is certified that error appears in the above-identified patent and that said Letters Patent is hereby corrected as shown below:

In the Specification

In Column 12, Line 8, delete "450" and insert --45°--, therefor.

In Column 13, Line 10, delete "1600" and insert --160°--, therefor.

Signed and Sealed this
Twenty-third Day of January, 2024

*Katherine Kelly Vidal*

Katherine Kelly Vidal
*Director of the United States Patent and Trademark Office*